Aug. 4, 1970     T. D. BIRCHALL     3,522,890
CAN PALLETIZER
Filed July 16, 1968     11 Sheets-Sheet 1
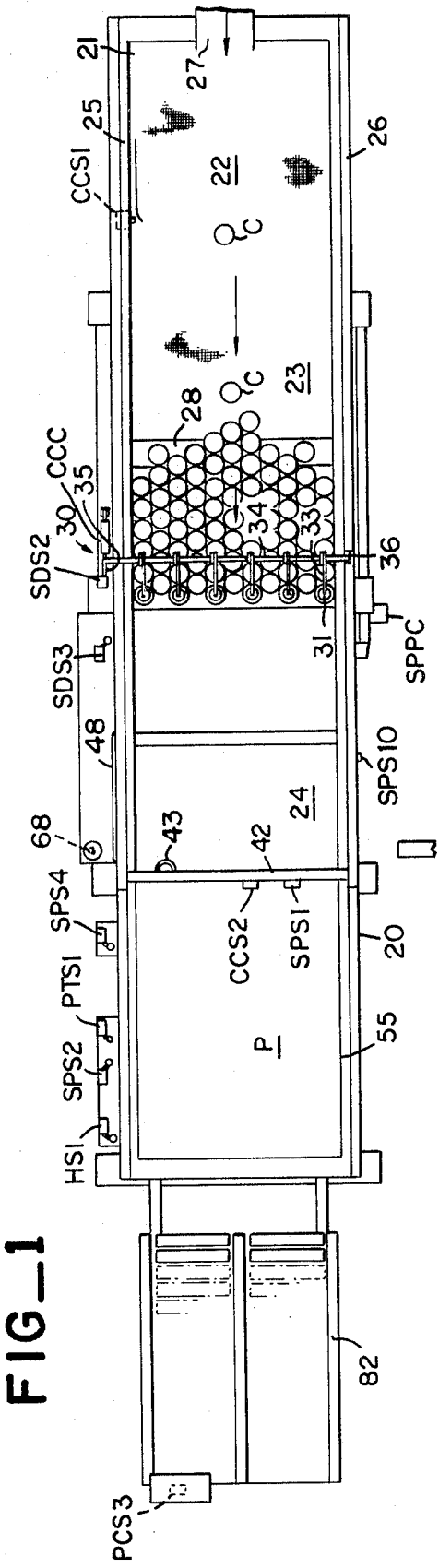
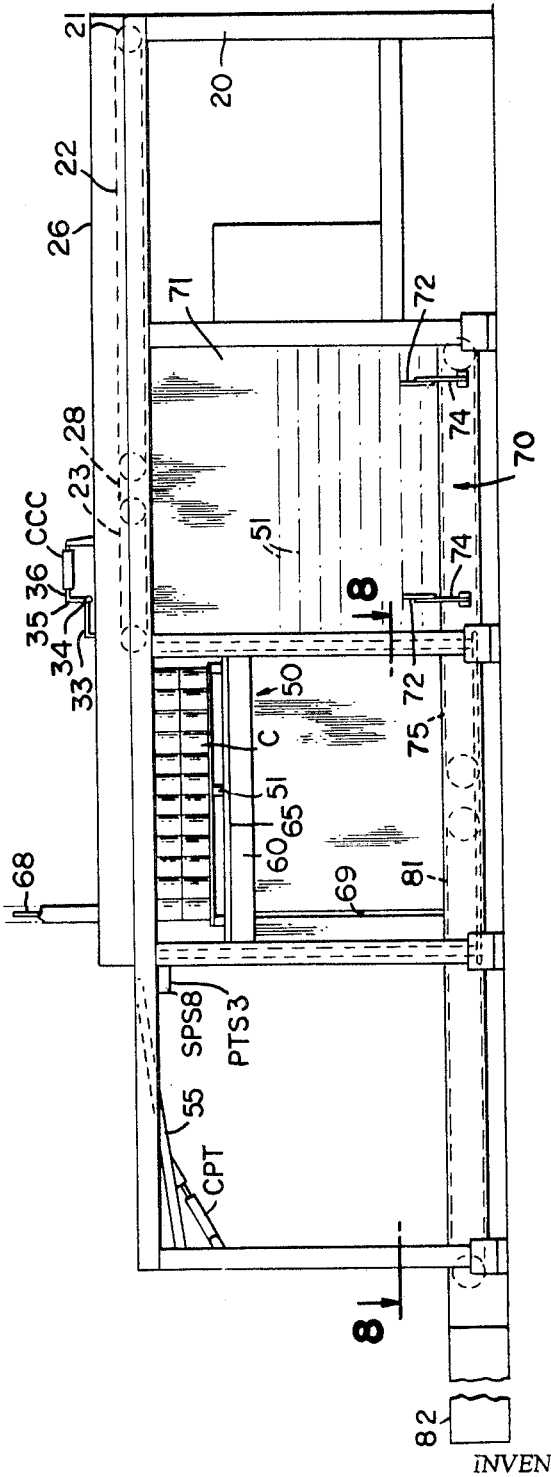
INVENTOR
THOMAS D. BIRCHALL
BY *Owen, Wickersham & Erickson*
ATTORNEYS Aug. 4, 1970  T. D. BIRCHALL  3,522,890
CAN PALLETIZER
Filed July 16, 1968  11 Sheets-Sheet 2
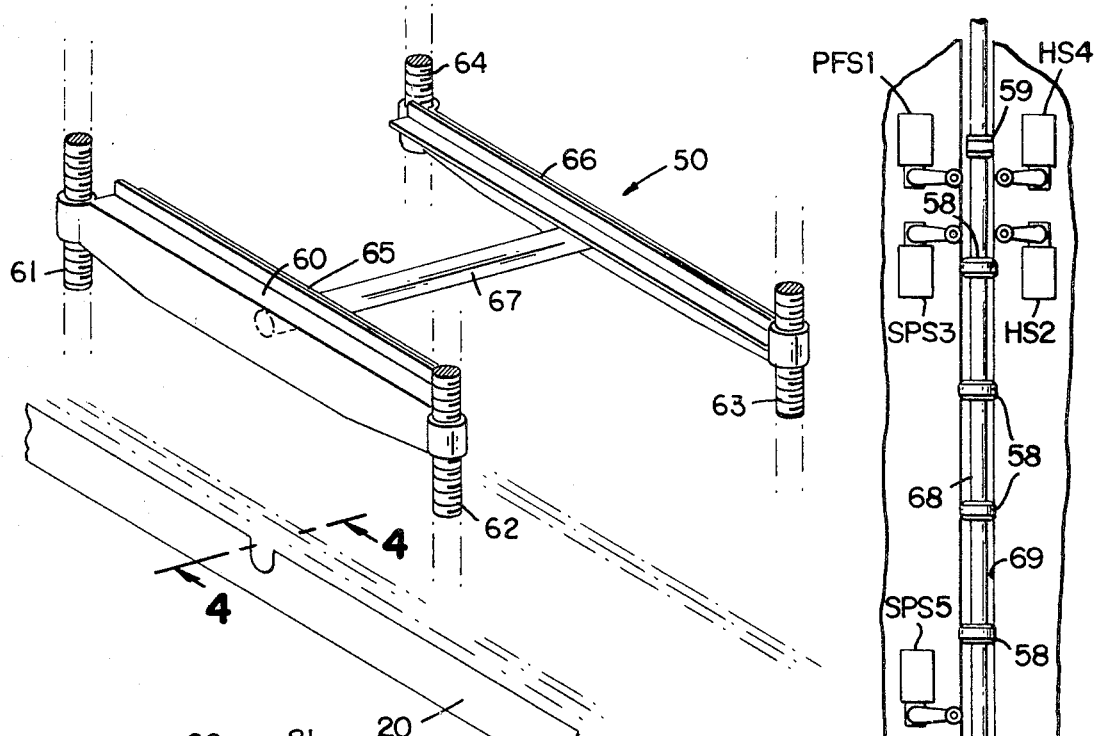
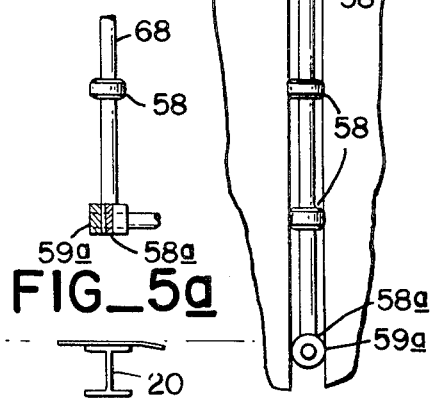
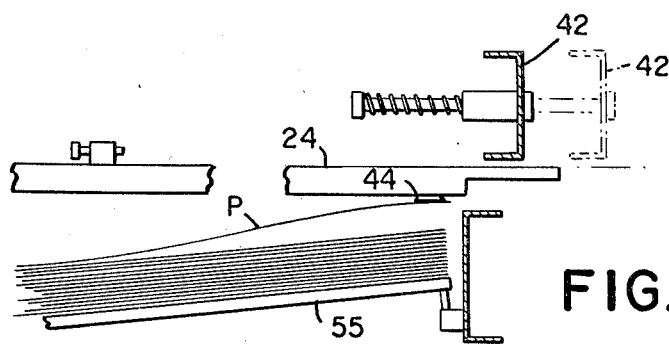
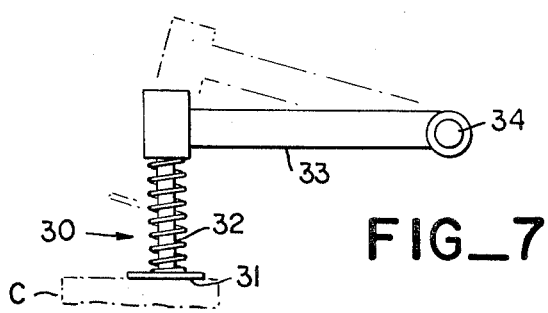
INVENTOR.
THOMAS D. BIRCHALL
BY
Owen, Wickersham & Erickson
ATTORNEYS

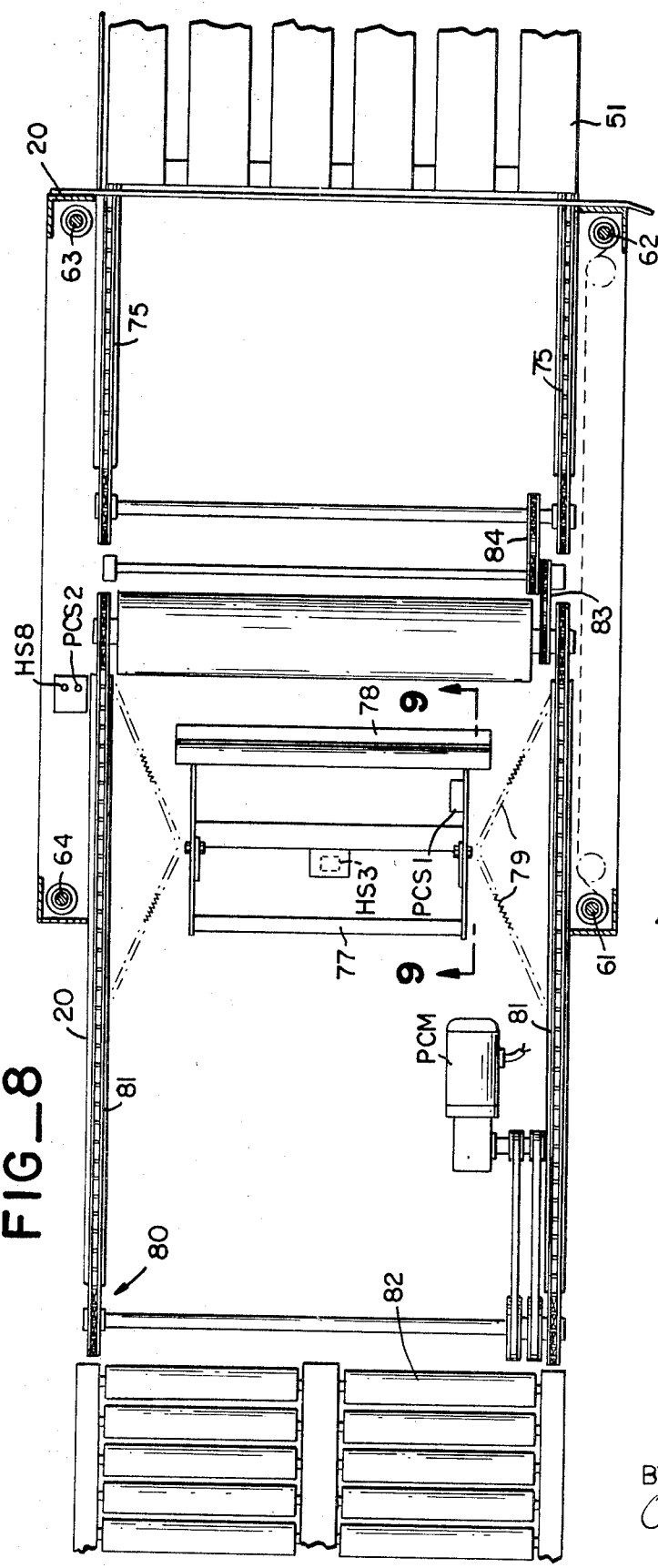
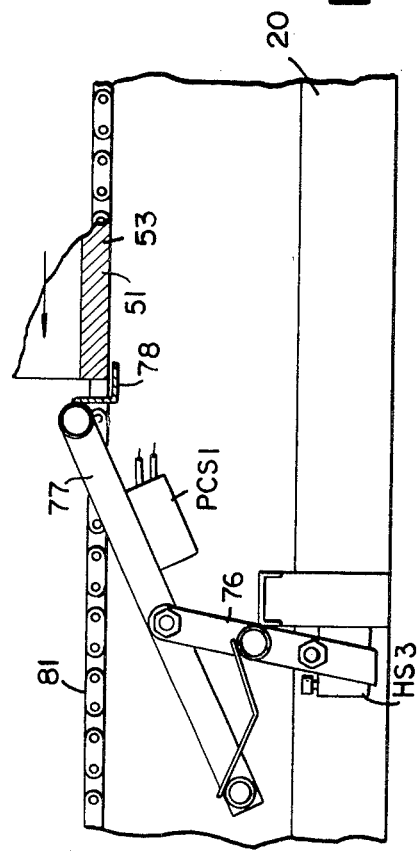

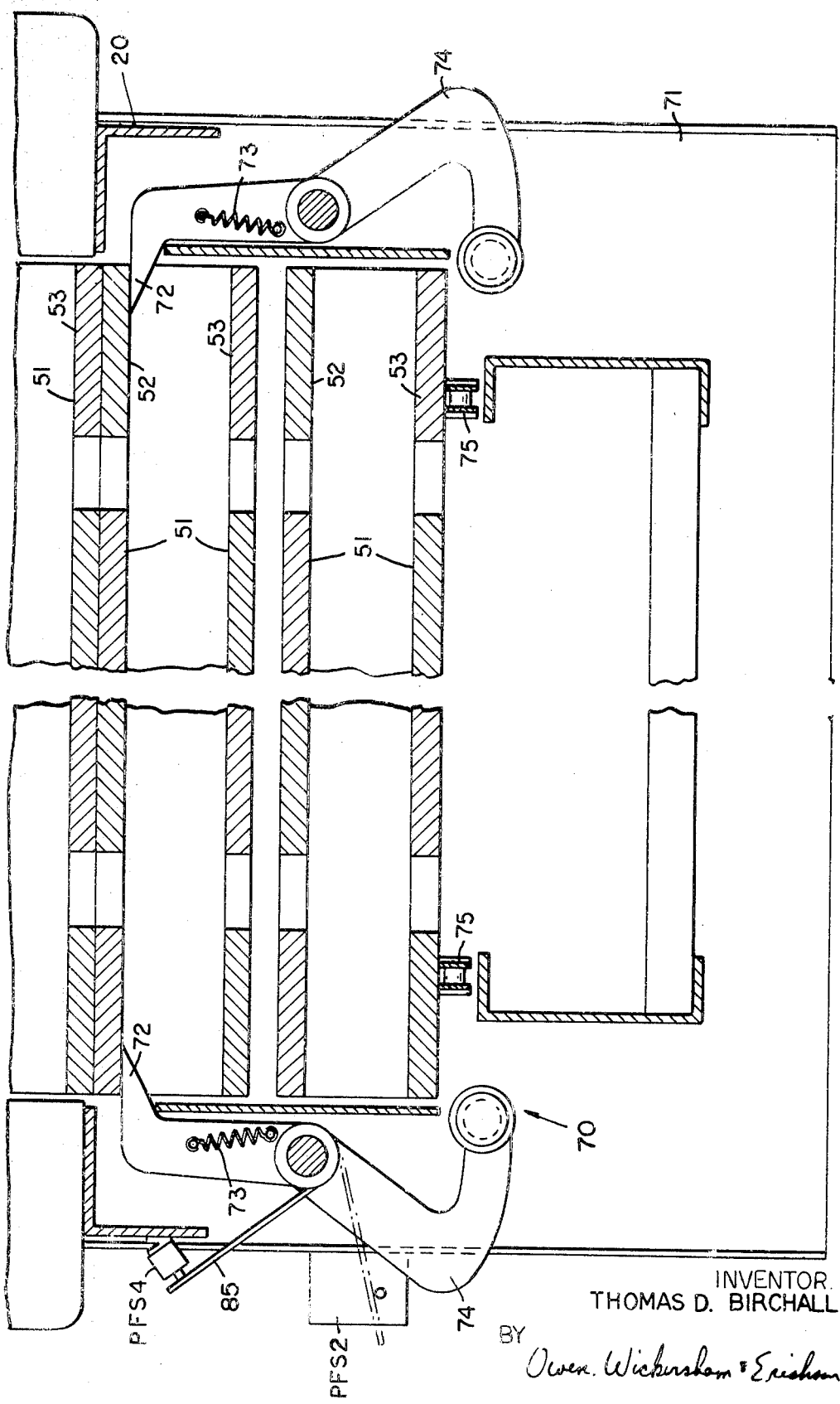

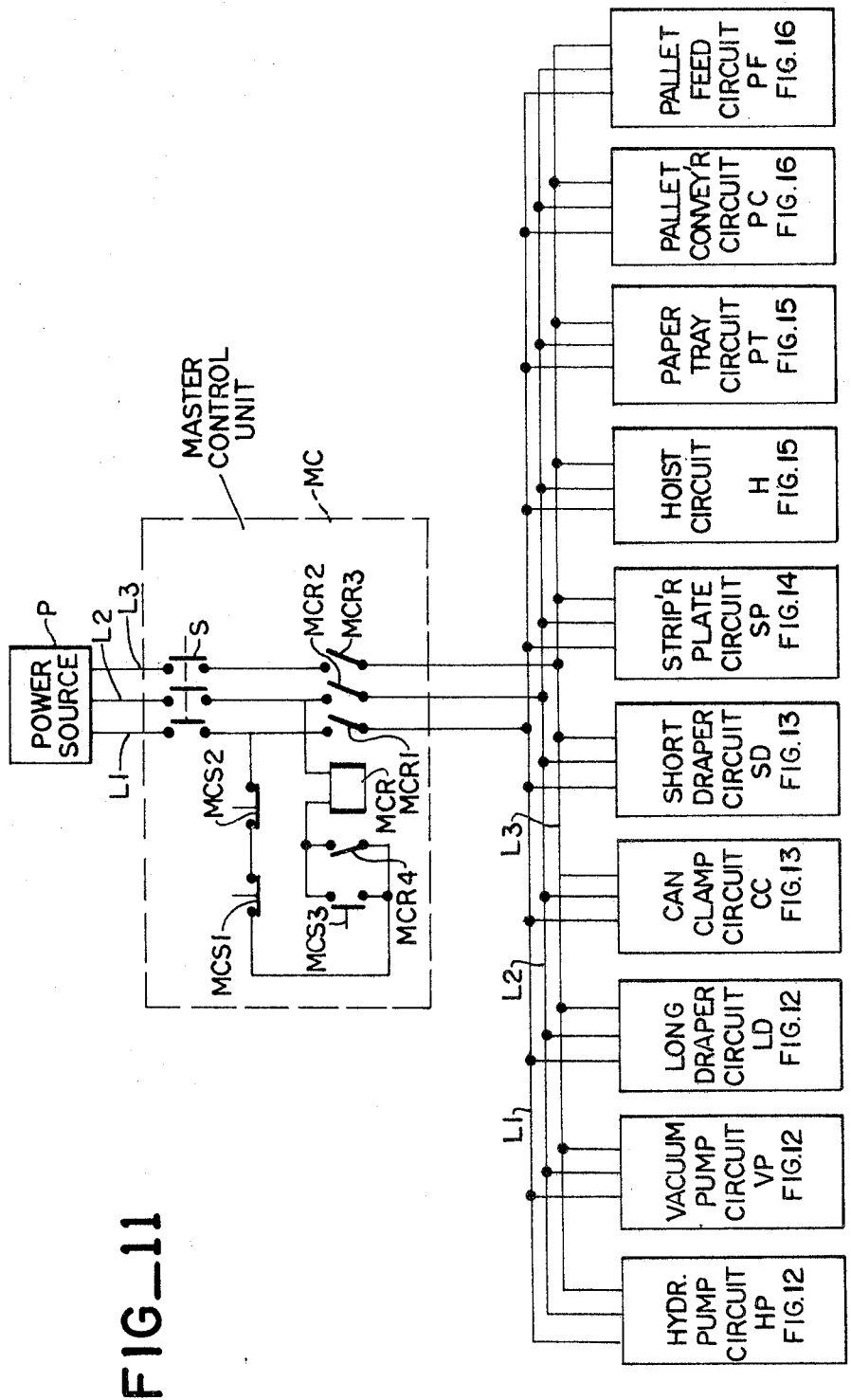

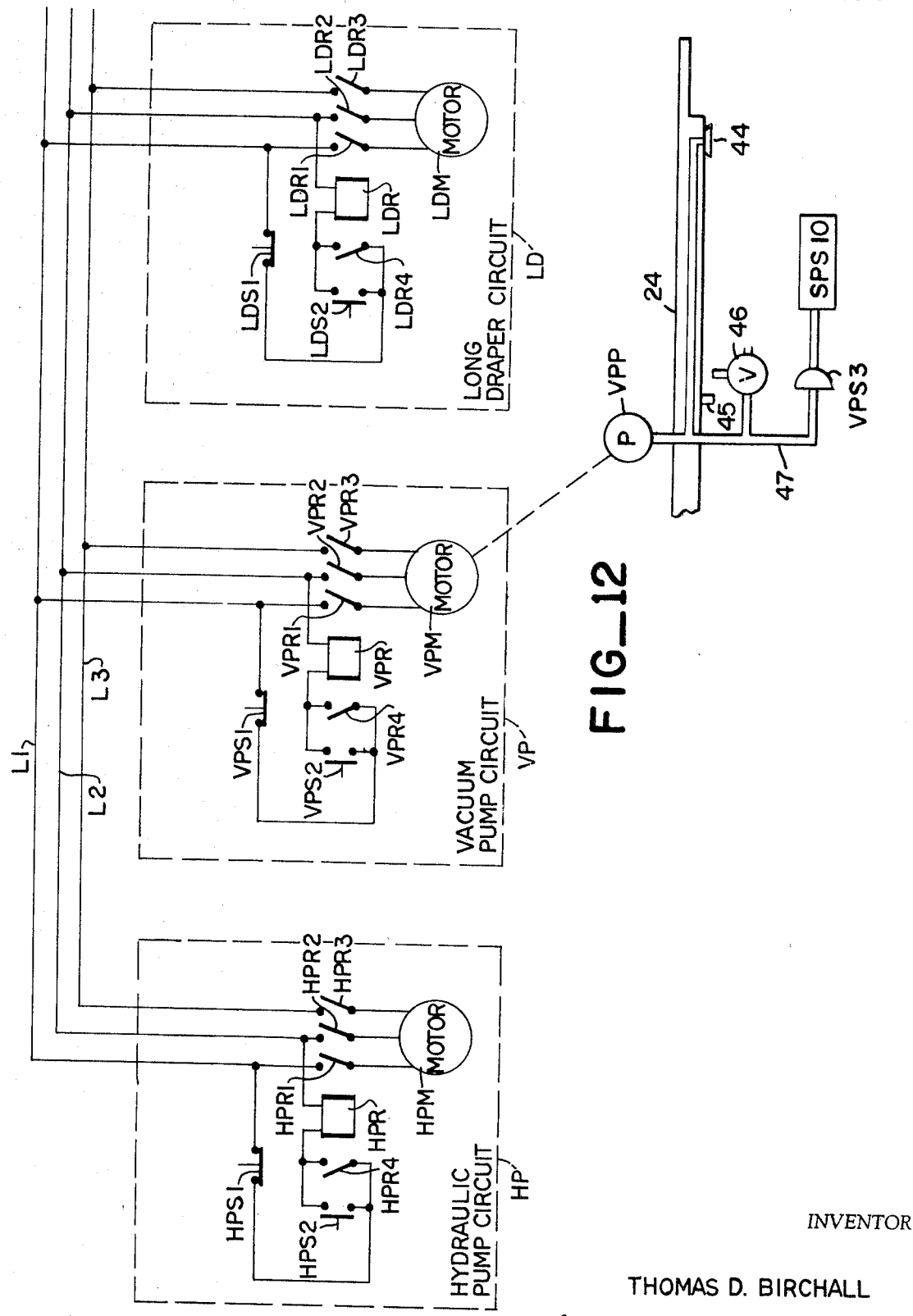

Aug. 4, 1970
T. D. BIRCHALL
3,522,890
CAN PALLETIZER
Filed July 16, 1968
11 Sheets-Sheet 7
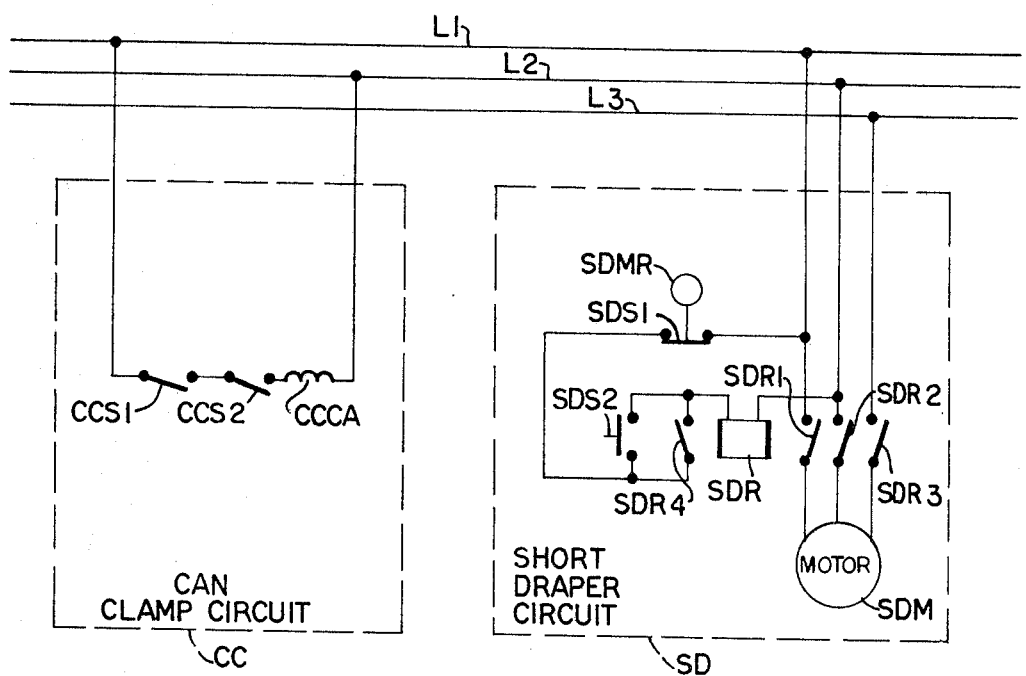
FIG_13
INVENTOR
THOMAS D. BIRCHALL
BY *Owen, Wickersham & Erickson*
ATTORNEYS

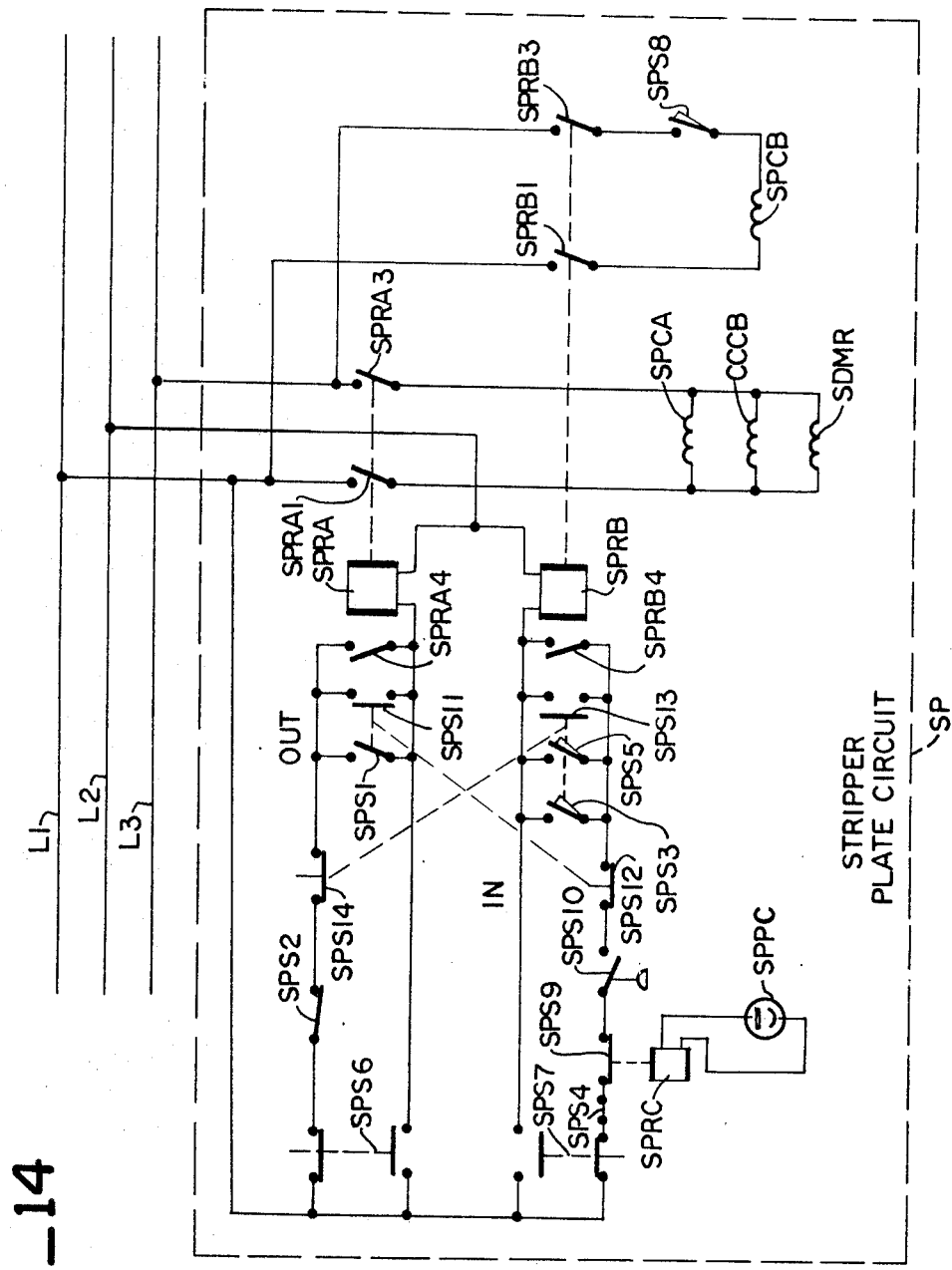

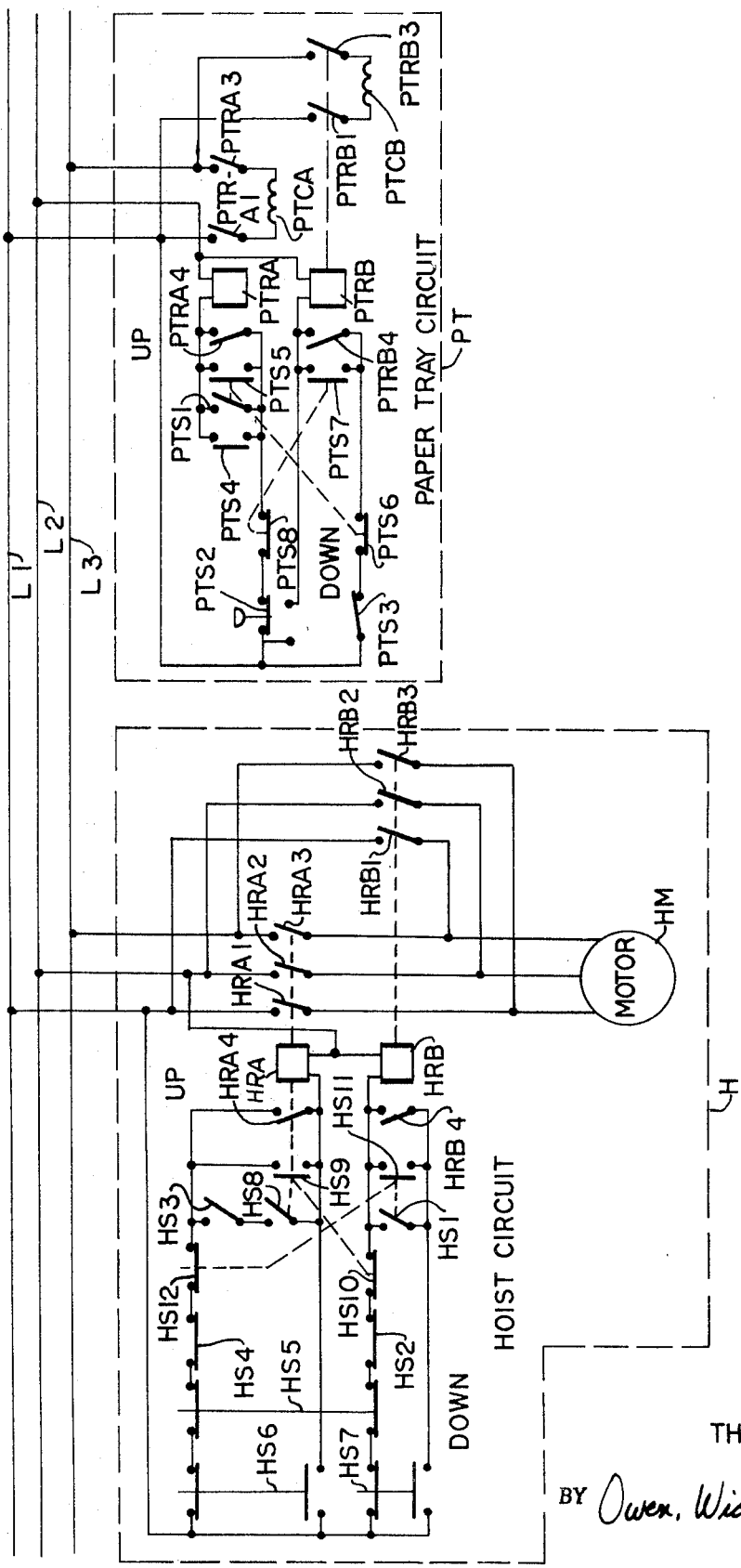

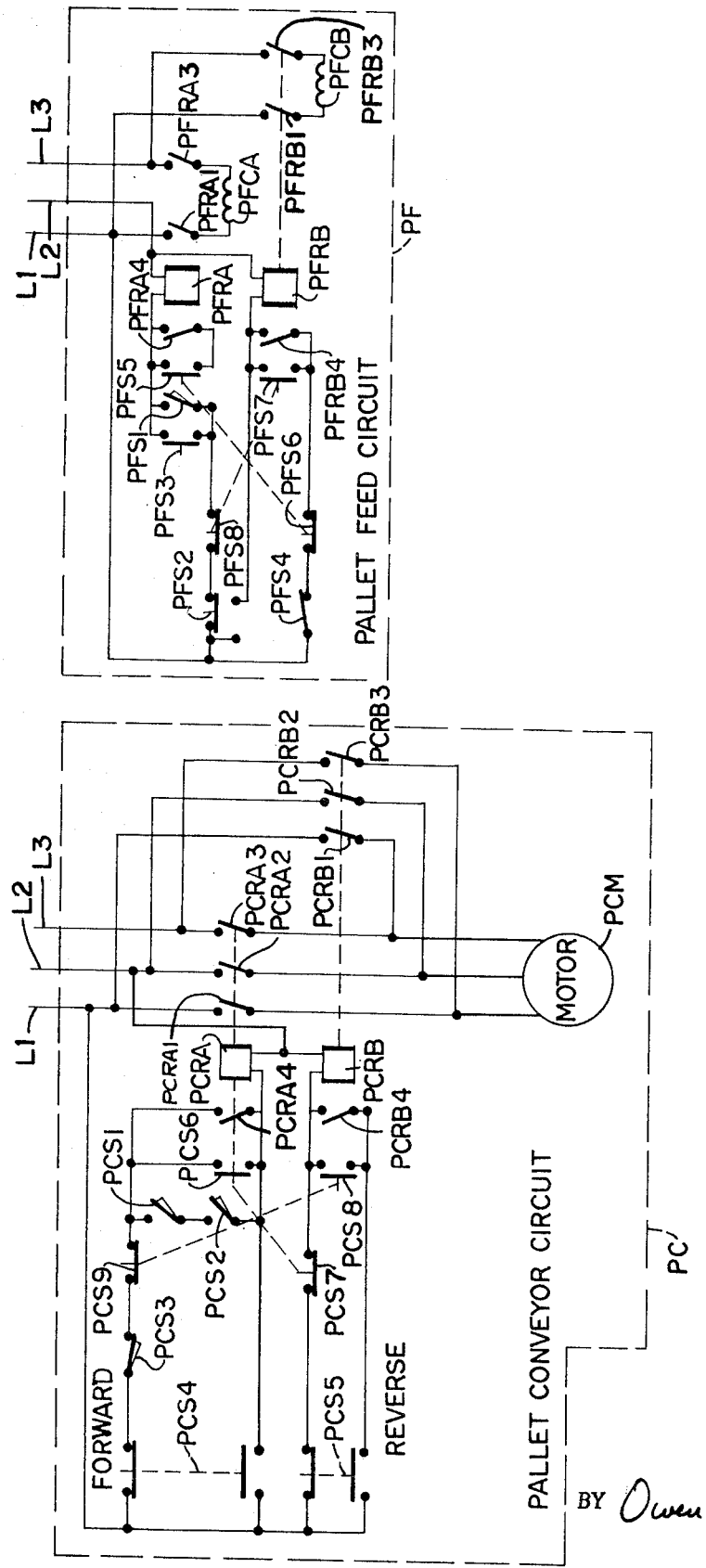

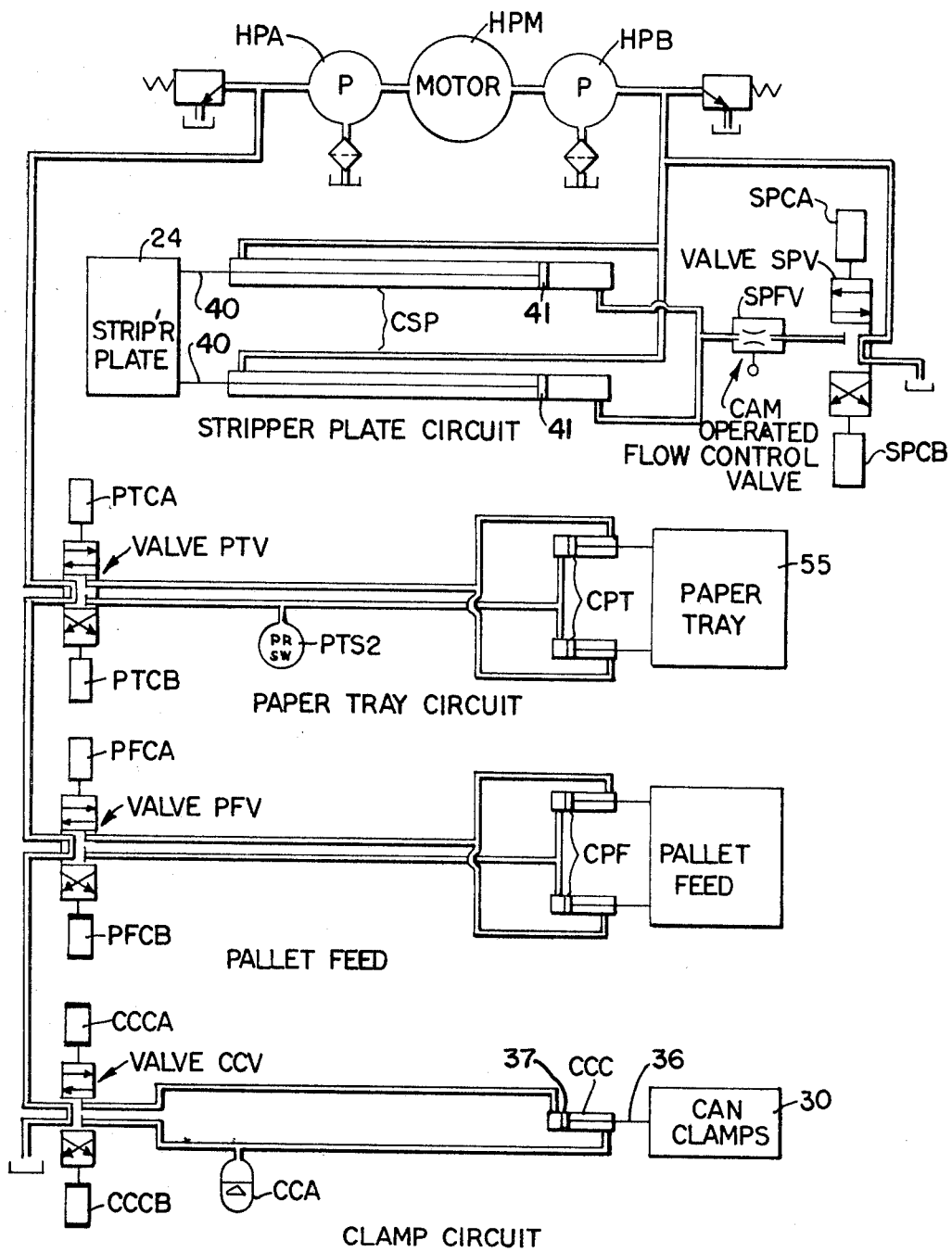
FIG_17

United States Patent Office 3,522,890
Patented Aug. 4, 1970

3,522,890
CAN PALLETIZER
Thomas D. Birchall, Turlock, Calif., assignor to G. W. Hume Company, Turlock, Calif., a corporation of California
Filed July 16, 1968, Ser. No. 745,274
Int. Cl. B65g 57/24
U.S. Cl. 214—6
18 Claims

ABSTRACT OF THE DISCLOSURE

In this automatic can palletizer cans are presented to a long draper and moved thereby to the rear end of a normally stationary short draper having at its forward end can clamps normally holding a front row of cans. A stripper plate lies adjacent the forward end of the short draper, and cans are delivered to it at transfer time. A hoist supports a pallet beneath the normal position of the stripper plate and raises a pallet to a level slightly below the stripper plate. A switch on the long draper releases the can clamps when a desired number of cans have been backed up behind the front row, and thereupon the short draper moves cans onto said stripper plate. Switches are actuated by the cans reaching a stripping wall at the end of the stripper plate, and they reenergize the can clamps, stop the short draper, and cause said stripper plate to move out beneath the stripping end wall and drop the cans onto the pallet or onto a layer of cans already on said pallet, to make a palletized can layer. The hoist is then lowered by the height of one layer of cans and is stopped. The stripper plate then returns to its original position adjacent the short draper. Each time the stripper plate reaches its fully stripped position it picks up a paper sheet the size of the area of the pallet, carries it with it on its return, and releases the paper sheet over the layer of cans. After a preselected number of layers has been deposited on the pallet, the hoist is automatically lowered and the loaded pallet transferred away from said hoist to a dock where it can be picked up and moved elsewhere. Meanwhile, a stack of empty pallets is retained adjacent the hoist, and one empty pallet is transferred to the hoist as the filled pallet is being transferred away therefrom, the empty pallet is then raised to its uppermost position. During this pallet transfer operation, the stripper plate is held in its stripped position, and as the empty pallet is raised and nears its uppermost position, the stripper plate is returned to its original position and deposits on the empty pallet a sheet of paper.

---

This invention relates to an improved can palletizer.

The present invention represents a great advance over my earlier invention described and claimed in U.S. Pat. No. 2,739,718. Particularly, my new palletizer is characterized by being fully automatic, so that once it is set up and operation has been begun, it can proceed with scant attention, mainly requiring occasional removal of each stacked pallet and additional of a new supply of pallets and paper sheets from time to time.

One object of the invention is to provide a palletizer that starts with a single-file line of cans or with some other supply of cans and places them automatically on pallets as layers and then automatically transfers a fully loaded pallet out of the machine, puts an empty one in, and continues the palletizing process—all automatically.

Another object of the invention is to provide a draper system that automatically forms a standard pattern of cans from cans that are introduced, in single file or otherwise, to the draper. No manually operated pattern-forming mechanism is required or used.

Another object of the invention is to transfer automatically a layer of cans, formed into the proper pattern, from the draper system to a pallet, stacking layer after layer on the pallet. An important feature of the invention is that the transfer from the pattern-forming draper to the pallet is accomplished automatically by moving the cans first onto a stripper plate and then stripping them from the plate without any complex mechanisms at the pattern-forming sector.

Another object of the invention is to lower the pallet automatically each time a layer of cans has been transferred to the pallet, the pallet being lowered exactly the right amount to receive the next layers.

Another object of the invention is to insert automatically over each layer of cans a sheet of paper to lock the stack. Similarly, a sheet of paper is automatically placed on each empty pallet before any cans are transferred to the pallet.

Another important feature of the invention is a series of safety devices that stop operation in certain contingencies.

Another object of the invention is to achieve automatic transfer of each loaded pallet from the station where the cans are stacked on it to a delivery station from whence it can be taken by a forklift truck without interrupting the flow of cans into the machine. A related object is automatically to insert another empty pallet immediately in the station for stacking cans thereon and moving it automatically into position to receive its first layer. Achievement of this object means that the only attention that need ordinarily be given the machine is to remove each fully loaded pallet from the delivery station, and from time to time to bring in another stack of pallets and some more interlocking paper. Otherwise, the machine runs completely automatically.

The invention comprises a long draper to which a single-file line of cans is introduced (or to which several such lines of cans are introduced) and from which the cans pass to a short draper, at the front of which a series of can clamps are used to hold a front row of cans in place. As more cans come onto the drapers, they automatically are formed into a pattern that first covers the short draper and then builds back on the long draper, which moves continuously and carries the cans forward and into the pattern. The short draper moves only after a complete layer of cans is ready to be placed onto the pallet. An expedient such as a microswitch located on the long draper then actuates a motor (or other drive) for the short draper and causes the clamps to be lifted from the front row of cans. The short draper then carries the cans onto a stripper plate and when the cans reach the far end of the stripper plate, they close microswitches there which stop the short draper, cause the can clamps to engage the front row of cans then on the short draper, and start the stripper plate moving to strip it out from under the layer of cans on it, so as to deposit those cans gently on to the palletized stack of cans below. A hoist carrying the pallet lowers the pallet by the height of one can, so that they are ready for the lext layer, and as the stripper plate returns to its position, as it does automatically, it places on top of the top layer of cans a sheet of paper which helps to lock the stack of cans.

After a pallet has been fully loaded, it bottoms against a set of switches which actuate a mechanism for carrying the fully loaded pallet out from the hoist on to a delivery platform, where it can be picked up by a forklift truck. At the same time an empty pallet is moved into the hoist and the hoist is automatically raised to the top position to be ready for the new pallet to receive a first layer of cans from the stripper plate.

Other features, objects, and advantages of the invention will appear from the following description of a preferred form thereof.

In the drawings:

FIG. 1 is a simplified top plan view of a palletizer embodying the principles of the invention.

FIG. 2 is a simplified view in side elevation of the palletizer of FIG. 1.

FIG. 3 is an enlarged view in perspective of the hoist mechanism, omitting some details and breaking off some parts to save room.

FIG. 4 is a view in section taken along the line 4—4 in FIG. 3.

FIG. 5 is a fragmentary frontal view in elevation of the control cam rod for the hoist mechanism.

FIG. 5A is a fragmentary view of the bottom portion of the rod of FIG. 5, shown partly in section and along a plane perpendicular to that of FIG. 5.

FIG. 6 is a fragmentary enlarged view in side elevation of the stripper plate and paper tray in the paper-pickup position.

FIG. 7 is a view in side elevation of the can clamp showing it in its clamping position in solid lines and showing in broken lines its released position.

FIG. 8 is a fragmentary enlarged plan view, partly in section taken along the line 8—8 in FIG. 2, showing the bottom of the hoist well and the pallet transfer mechanism.

FIG. 9 is an enlarged view in side elevation and partly in section of a portion of FIG. 8 taken generally along the line 9—9 in FIG. 8 but at the time of transfer of an empty pallet to the hoist.

FIG. 10 is an enlarged view in vertical section of the mechanism in the pallet feed device for releasing one pallet at a time to the hoist.

FIG. 11 is a block diagram of the electric circuit of the invention, showing the master control unit and referring to subsequent figures which give the details for each block.

FIG. 12 is a circuit diagram of the circuits for the hydraulic pump block, the vacuum pump block, and the long draper block of FIG. 11. It also shows the vacuum circuit.

FIG. 13 is a diagram of the circuits for the can clamp block and the short draper block of FIG. 11.

FIG. 14 is a circuit diagram of the stripper plate block of FIG. 11.

FIG. 15 is a circuit diagram of the hoist block and the paper tray block of FIG. 11.

FIG. 16 is a circuit diagram of the pallet conveyor block and the pallet feed block of FIG. 11.

FIG. 17 is a diagram of the hydraulic circuit of the invention.

As shown in FIGS. 1 and 2, the palletizer of this invention comprises a main frame 20 which supports on its upper end two belt conveyors. The first one, reading from the input end 21, is termed a long draper 22 and the second one a short draper 23, both of them having their top surface move in the direction from the input end 21 toward a stripper plate 24. They are bounded by side walls 25 and 26 and may have a stationary plate 28 bridging between them. The long draper 22 moves continuously during normal operation, being driven by a motor LDM (FIG. 12). Preferably, a single-file conveyor 27 brings cans C to the long draper 22 and deposits them thereon in single file at the center of the long draper 22. However, several single-file conveyors 27 may be used for one long draper 22, or other types of can conveyors may be used to supply the long draper with cans. I have found that when cans are so deposited and when a diamond type pattern as shown in FIG. 1 is initially set up, the cans automatically keep forming this diamond pattern.

The short draper 23, unlike the longer draper 22, does not move continuously but is operated intermittently by its own motor SDM (see FIG. 13). At the front of the short draper 23 is a hydraulically operated can clamp assembly 30 (see FIG. 7) comprising a plurality of clamp feet 31 each adjustably and yieldingly mounted on a stud 32, which is carried on an arm 33. The arms 33 are all secured to a shaft 34, as is a crank 35, at one end, to which is secured a rod 36 extending from a piston 37 of a cylinder CCC (see FIG. 17).

Beyond the can clamps 30 and the short draper 23 is the stripper plate 24, to which the cans C are transferred by the short draper 23 when the clamps 30 have been released and the motor SDM started. The stripper plate 24 is preferably mounted on guides and may be secured to the front ends of connecting rods 40 from pistons 41 of two hydraulic cylinders CSP (see FIG. 17), so that the plate 24 is moved slightly further than its own length by the full stroke of the piston 41, passing under an end wall 42 to strip the cans C from the plate 24 so that they drop gently onto a pallet 51 or onto a layer of cans previously stacked thereon. Pneumatic cylinders or motors and mechanical drives may be used instead of the hydraulic apparatus. The pallet 51 is, at the time when the cans drop, supported by a hoist mechanism 50 (see FIG. 3), and the pallet 51 has upper and lower decks 52 and 53, shown best in FIG. 10. The drop is usually only slightly greater than the thickness of the stripper plate 24 itself, so that the cans are gently transferred. Actuation of the cylinders CSP may be accomplished by a switch SPSI mounted on the end wall 42 (FIG. 1) and engaged by the front row of cans. A semicircular locater 43 on the wall 42 is exactly the size of one-half of a can C and acts to locate the pattern of cans properly to keep the cans aligned.

On the bottom of the stripper plate 24 (see FIG. 6) may be a series of vacuum cups 44, all connected to a vacuum circuit which is actuated by a cam 45 on the plate 24 closing a normally open valve 46 in a vacuum line 47, as shown in FIG. 12. The stripper plate 24, or its carriage, may also carry one or more cams 48 for actuation of certain microswitches.

When the stripper plate 24 is moved out, it lies above a paper feed tray 55, which may be supported by a hydraulic mechanism which includes two cylinders CPT for raising and lowering one end of the paper feed tray 55, the other end being pivotally supported. These mechanisms (or suitable pneumatic or mechanical devices) raise one end of the tray 55 in an arc, until that end approaches the bottom of the stripper plate 24. Then a piece of paper P is picked up and held by the suction cups 44, and the tray 55 is lowered back to its original position. Later, the sheet of paper P is released by opening the valve 46 to break the vacuum, and it drops onto a layer of cans C on the pallet 51. The purpose of these pieces of paper P, which are the same area as the pallet 51 and which re deposited first on the empty pallet 51 and then over each layer of cans on the pallet 51, is to tie all the can layers together, so that when the loaded pallet 51 is transported on a fork lift truck, the load will be held together. This use of paper sheets, preferably thick, strong paper, has been found very efficacious.

As will be described later, the mechanism automatically raises and lowers its end of the paper feed tray 55, and safety features assure that that end of the tray 55 is brought down out of the way of the stripper plate 24 before the stripper plate 24 can move back.

The hoist mechanism 50, to which the device transfers the cans and which supports the pallet 51 on which the cans are loaded, may comprise a platform 60 (see FIG. 3) mounted on a set of screws 61, 62, 63, 64 and a motor HM (see FIG. 15) for turning the screws 61, 62, 63, 64 so as to move the platform 60 up and down. The platform 60 comprises two flanged bars 65 and 66 joined by a brace 67 beneath the surfaces on which the pallet 51 rests. As shown in FIG. 5, a series of microswitches PSF1, HS4, SPS3, HS2 and SPS5 is mounted vertically for actuation, as will be described when discussing the electrical circuit, and the hoist 50 is provided with a cam rod 68 that moves up and down with the platform 60 along an opening 69 and carries a series of cams 58, 58a, 59 and 59a which serve to actuate these microswitches. There is one cam 58 for each layer of cans to be stacked on the pallet, except for the last can layer, which may be considered to be associated with the top cam 59, which is different in having only one actuating side, so that it actuates only switches PFS1 and SPS3, and except for the bottommost cam 58a which is really a hub performing the same function as the cams 58 except that it also carries an additional cam 59a.

Beneath the short draper 23 is provided a pallet feed device 70 (see FIGS. 1 and 10) which enables a stack of pallets 51 to be placed in a pallet feed bin 71 for transfer of one empty pallet 51 at a time to the hoist mechanism 50, i.e., each time when a loaded pallet there has been moved out by means of a pallet conveyor device 80. The pallet feed mechanism 70 may include two pairs of dogs 72 on each side of the pallet stack. Over-the-center springs 73 may normally urge the dogs 72 to a position between the upper and lower decks 52 and 53 of a pallet 51. Hydraulically (or pneumatically or mechanically) actuated cranks 74 may enable retraction of the dogs 72 to drop the bottom pallet onto a set of conveyor chains 75, which later transfers the empty pallet 51 onto the hoist platform 60 at the time when the pallet conveyor device 80 is actuated to move out a loaded pallet. This pallet conveyor device 80 operates when the hoist paltform 60 reaches the bottom of its travel, transfers the fully loaded pallet 51 onto a set of outlet conveyor chains 81, and actuates microswitches to energize a motor PCM that moves the chains 81 to carry the loaded pallet 51 over to a delivery dock station 82.

When the hoist platform 60 bottoms with its loaded pallet 51, its central brace 67 lies in between the adjacent ends of two chains 75 and 81, and the platform rails 65 and 66 lie below the top surface of the chains 75 and 81 (see FIG. 4), so that the fully loaded pallet 51 then rests on the chains 75 and 81. In between the chains 81 (see FIGS. 8 and 9) frame members 76 preferably support a pivoted assembly 77 having a front stop bar 78, normally urged up into the position shown in FIG. 9 by springs 79, shown in FIG. 8. When the loaded hoist 50 bottoms, the loaded pallet 51 also preferably rests on the assembly 77, depresses it and causes it to activate a microswitch PCS1, while the bottomed hoist platform 60 preferably simultaneously actuates a microswitch PCS2. This causes the motor PCM (or other such device) to drive the chains 81 and also to drive the chains 75 through chains 83 and 84.

Hence, the loaded pallet is moved off to the deck 82 by the chains 81, while the chains 75 bring in an empty pallet from beneath the dogs 72. When the loaded pallet 51 has passed over the assembly 77, the springs 79 right the assembly 77, and so the stop 78 stops the empty pallet 51 and retains it in its proper position over the hoist platform 60 until lifted by upward motion of the hoist 50, even though the chains 75 and 81 continue to run until a microswitch PCS3 is engaged by the loaded pallet reaching the proper position on the dock 82.

The electric circuit in general

The electric circuit for this device is best understood with reference, first, to FIG. 11, a block diagram, and then to FIGS. 12 through 16 showing the circuits for each of the blocks. Note that the block diagram, FIG. 11, also serves as an index for finding the individual circuits. Details of this circuit may be varied, but the example about to be given illustrates the principles involved.

As shown in FIG. 11, there is a master control unit MC to which are connected all the other circuits, namely, a hydraulic pump circuit HP, vacuum pump circuit VP, a long draper circuit LD, a can clamp circuit CC, a short draper circuit SD, a stripper plate circuit SP, a hoist circuit H, a paper tray circuit PT, a pallet conveyor circuit PC, and a pallet feed circuit PF. From a power source P three lines L1, L2, and L3 pass through the master control unit MC to the other units. Each line may be provided with the usual disconnect circuit breakers and so on, which are not shown because they are so common.

The master control unit MC

The master control unit MC may include a master switch S for hand closure of the entire circuit. In addition, it has, in series between lines L1 and L2, a normally closed manually operable normal stop switch MCS1, a normally closed manually operable emergency stop switch MCS2, a normally open manually energizable start switch MCS3, and a relay MCR.

Since the stop switches MCS1 and MCS2 are normally closed, closure of the start switch MCS3 energizes the relay MCR, which then closes four normally open switch arms MCR1 in line L1, MCR2 in line L2, MCR3 in line L3 and a holding switch MCR4 across the normally open start switch MCS3. Hence, once the start switch MCS3 is pressed, it can be released just as soon as the holding switch MCR4 has taken over. Thereupon, the main circuit remains energized until one of the two stop switches MCS1 or MCS2 is pressed to open the circuit. The master control unit controls all the rest of the circuits, and if the switches MCR1, MCR2, and MCR3 are open, none of the other circuits can be energized. If these switches are closed, any of the circuits can be energized. Either of the two stop switches MCS1 and MCS2 serves to open the master circuits, the first one being on a main panel, and the second one being a safety switch on the other side of the machine from the main panel, both of them enabling instant shutting down of the entire machine.

The hydraulic pump circuit HP (FIG. 12)

The hydraulic pump circuit HP is solely for actuating a three-phase motor HPM, which is the motor for the hydraulic pumps HPA and HPB which operate the hydraulic circuit of FIG. 17. If desired, a pneumatic circuit could be used, or electric motors could be used to do everything the hydraulic circuit does, but this gives one example of feasible operation. The circuit HP has a normally closed manually operable stop switch HPS1, a normally open manual start switch HPS2, and a relay HPR, all in series across lines L1 and L2. The relay HPR, when energized, closes four normally open switch arms HPR1, HPR2, HPR3, and HPR4. The switch HPR4 is a holding switch across the start switch HPS2; the other three relay-operated switches are across the lines L1, L2 and L3, respectively, and they control the power to the motor HPM. Normally, the motor HPM runs continuously as long as the palletizer machine is being operated.

The vacuum pump circuit UP (FIG. 12)

The vacuum pump circuit is substantially identical to that of the hydraulic pump. It operates a vacuum pump motor VPM for the paper pickup operation, supplying the vacuum for the suction cups 44. Again, there is a control circuit across lines L1 and L2 having, in series, normally closed manually operated stop switch VPS1, a normally open manual start switch VPS2, and a relay VPR. The relay VPR, when energized, closes four normally open switches, the first three of which VPR1, VPR2, and VPR3, are across the three lines L1, L2, and L3, and when closed, cause operation of the motor VPM which runs continuously while the palletizer is being operated. The fourth switch is a holding switch VPR4 across the start switch VPS2. Although not part of the electrical circuit, for the sake of convenience, the vacuum circuit is shown in FIG. 12. The motor VPM operates a pump VPP to exert a vacuum in the line 47. When the valve 46 is open, as it normally is, the vacuum to the cups 44 is bled, but when the cam 45 on the stripper plate 24 or on its carriage closes the valve 46, there is vacuum at the cups 44. They then pick up a sheet of paper, carry it along as the stripper plate 24 moves "in" and drop the sheet of paper P when the valve 46 is again opened. A vacuum pressure switch SPS10 is closed by sensor VPS3 when there is vacuum in the line 47 and is otherwise open.

The long draper circuit LD (FIG. 12)

The long draper circuit LD is substantially identical to the two pump motor circuits just described. It operates a motor LDM for the long draper that forms the can pattern and runs continuously during operation, as do the two motors HPM and VPM. There is a normally closed manually operated stop switch LDS1, a normally open manual start switch LDS2, and a relay LDR, all in series across the lines L1 and L2. When the relay LDR is energized, four normally open switches are closed; three of them, switches LDR1, LDR2, and LDR3 are respectively across the lines L1, L2 and L3 and serve to enable operation of the motor LDM. The fourth switch LDR4 is a holding switch across the start switch LDS2.

The can clamp circuit CC (FIG. 13)

The can clamp circuit CC may utilize only the two lines L1 and L2. Across them, in series, are a bistable normally open start up switch CCS1, a bistable normally closed stripper plate position monitor switch CCS2, and a solenoid CCCA for a can clamp solenoid valve CCV which is shown in the hydraulic circuit, FIG. 17. The circuit CC effectuates release of the clamps 30 that have held down the front line of cans during formation of a patterned layer of cans, for release of cans that are then to be moved to the stripper plate 24 and transferred to the pallet on the hoist 50. The switch CCS1 is on the side wall 25 and is actuated by the cans that have built up their pattern far enough for transfer to be appropriate. The switch CCS2 is a normally open microswitch that is held closely by the stripper plate 24 when and only when the stripper plate 24 is in the correct position to receive cans. It thus prevents the can clamps 30 from being raised unless the stripper plate 24 can receive cans. It may be termed a stripper-plate position monitor.

The short draper circuit SD (FIG. 13)

The short draper circuit SD turns on and off the motor SDM for the short draper 23, for moving a layer of cans onto the stripper plate 24. It has a normally closed relay operated stop switch SDS1 in series with a normally open mechanically operated start switch SDS2 and a relay SDR. The switch SDS2 is preferably adjacent to the can clamp assembly 30 and is actuated thereby when the can clamp 30 is fully open. When the relay SDR is energized, its four normally open switches are closed; three of them, switches SDR1, SDR2 and SDR3, are respectively across the lines L1, L2 and L3, and when they are closed, the motor SDM operates. The fourth switch is a holding switch SDR4 across the start switch SDS2. The stop switch SDS1 is operated by a motor control relay SDMR which is actuated by the closure of the "start-out" circuit of the stripper plate's magnetic reversing starter, as described in connection with FIG. 14.

The stripper plate circuit (FIG. 14)

The stripper plate circuit SP is somewhat more complicated than the circuits which have been described so far. Basically, however, the circuit, which may be termed a magnetic reversing starter, is substantially the same except that there are double control circuits, one for moving the stripper plate 24 in an "out" direction and one for moving it in an "in" direction, there are interlocks between the two control cricuits, and a series of solenoids is preferably used instead of motors, though motors could be used, if desired. Thus, between the lines L1 and L2 there is in series a normally open start-"out" switch SPS1, a normally closed stop-"out" switch SPS2, and a relay SPRA, which, when energized, closes three normally open switches, SPRA1, SPRA3, and SPRA4. (In this instance only two of the three lines are used, but the controlled lines are considered to be lines L1 and L3, so that the switches controlling those have been numbered SPRA1 and SPRA3.) There is also the holding switch SPRA4 in parallel with the start-"out" switch SPS1. The start-"out" switch SPS1 may be on the end wall 42 and may be actuated by cans coming against the wall 42, indicating that a full layer of cans then rests on the stripper plate 24. The locater 43 helps to assure proper pattern formation at this time. The stop-"out" switch SPS2 is on the frame 20 and is actuated by the cam 48 when the stripper plate 24 approaches its full "out" position.

The "in" circuit includes, in series, a normally open regular start-"in" switch SPS3, a normally closed stop-"in" switch SPS4, and a relay SPRB. The switch SPS3 is actuated by each cam 58 of the hoist 50 and by the hub 58a (which acts like a cam 58) moving down past it; it is not actuated by upward movement of the cams 58 or hub 58a. The switch SPS4 is on the frame 20 and is actuated by inward movement of the cam 48 as the stripper plate 24 approaches its fully "in" position; it is not actuated by outward movement of the cam 48. The relay SPRB, when energized, closes three normally open switches SPRB1 and SPRB3 and SPRB4, the last-named one being a holding switch. In this instance there is a new-pallet start-"in" switch SPS5 in parallel with the regular start-"in" switch SPS3 and with the holding switch SPRB4. The switch SPS5 is actuated by upward movement of a cam 59a held by the hub 58a of the hoist rod 68 when a new empty pallet is being raised to the top by the hoist 50.

In addition to the normal switching just described, "jog-out" and "jog-in" switches are provided for manually moving the stripper plate 24 a short distance, i.e., for as long as the respective jog switch is held down. The jog-out switch SPS6 is a double switch, one part of which is normally closed and is in series with the start and stop switches SPS1 and SPS2; the other part of the jog-out switch, SPS6 is normally open and is in direct series with the coil SPRA. Similarly, the jog-in switch SPS7 has a normally closed arm which is opened during operation and which is in series with the stop switch SPS4 and the start switches SPS3 and SPS5, and it has a normally open switch portion which is in direct series with the coil SPRB. By this double switch arrangement the holding switches SPRA4 and SPRB4 are not allowed to come into play during jogging; therefore upon release of either the jog-out or jog-in switch, the appropriate relay SPRA or SPRB is deenergized.

Closure of the "out" circuit relay switches SPRA1 and SPRA3 energizes two solenoids SPCA and CCCB and one relay coil SDMR. Closure of the "in" circuit switches SPRB1 and SPRB3 energizes a solenoid SPCB. The solenoids SPCA and SPCB, respectively, act to move the stripper plate 24 out and to return it to its original position, by actuating the valve SPV in FIG. 17. The solenoid CCCB actuates the can clamp valve CCV to close the clamps 30 to hold a new front row of cans C. The relay SDMR is used to stop the motor SDM by opening the switch SDS1 in FIG. 13. The switches SPRB1 and SPRB3 and the "plate in" solenoid SPCB are in series with a paper tray position monitor switch SPS8, which is normally closed but which, when it is open, prevents movement "in" of the stripper plate 24; the switch SPS8 is closed by bottoming of the paper tray 55, and it is open whenever the paper tray 55 is not bottomed.

In the "in" portion of the stripper plate circuit is a photocell-actuated switch SPS9 which is normally closed, but if a light path to a photocell SPPC (located on the frame 20 near the top of the hoist well) is obscured (by an out-of-place can, as described later), the switch SPS9 is opened by a relay SPRC. Also, the normally open vacuum pressure operated switch SPS10 is closed by the sensor VPS3 (FIG. 12) when the vacuum in the paper pickup vacuum line 47 is being maintained and is opened if there is no vacuum in the line. It must be closed, of course, before the stripper plate 24 can move in the "in" direction.

In addition, there are interlock switches to make sure that the "in" relay SPRA cannot be energized at the same time as the "out" relay SPRB. A switch SPS11 is normally open, but is closed by closure of the start-"out" switch SPS1, they being linked together mechanically. The switch SPS11 is interlocked with a switch SPS12 and opens it when the switch SPS11 is closed. Similarly, there is an interlock between a switch SPS13 that is closed when either of the start-"in" switches SPS3 or SPS5 are closed and, when it is closed, opens a switch SPS14 to make sure that the out-moving circuit cannot be automatically operated during that time.

The hoist circuit H (FIG. 15)

The hoist circuit H is another magnetic reversing starter switch and is used to impart two movements to the hoist 50: an "up" movement and a "down" movement; it also has interlocks and jog switches. The down movement control includes a normally open "start down" switch HS1, a normally closed "stop down" switch HS2, and a relay HRB, all in series. The "start down" switch HS1 is on the frame 20 (FIG. 1) and is actuated by the cam 48 where the stripper plate 24 reaches its "out" position from its fully "in" position. The "stop down" switch HS2 is actuated by each cam 58a, 58, and 59 on the rod 68 after a predetermined drop in the hoist platform 60 (FIG. 5). It is actuated by the cam 59 only when a fully loaded pallet is lowered on to the pallet conveyor chains 81. The relay HRB, when energized, closes the usual four normally open switches HRB1, HRB2, HRB3 in the lines L1, L2, and L3 and the holding switch HRB4 in parallel with the "start down" switch HS1. In the "up" movement control there is a normally open "start-up" switch HS3 in series with a normally closed stop switch HS4 and an "up" relay HRA having normally-open switches HRA1, HRA2, HRA3 in lines L1, L2, and L3 and its normally open holding switch HRA4. The "up" start switch HS3 is actuated by the pivoting of the frame 76 when a new empty pallet 51 pushes the stop 78 (FIG. 9). The switch HS3 is, however, in series also with a safety switch HS8 that is closed only when the hoist 50 is fully bottomed; so the relay HRA is actuated only when both switches HS3 and HS8 are closed. The "up" stop switch HS4 is actuated by the bottom cam 59a when it reaches its uppermost position.

An emergency stop for both the up and down circuits is provided by a manually operated tandem switch HS5. Jog switches HS6 and HS7 operate substantially as in the operation while either switch is actually held down. Interlock switches HS9, HS10, HS11, and HS12 are also provided just as in the stripper plate circuit SP and operate in the same manner.

The hoist motor HM is thus operated in the "up" direction by the closure of the relay HRA and in the "down" direction by the relay HRB, as shown by the reversing circuitry in FIG. 15. The safety arrangement provided by the switch HS8 being in series with the switch HS3, so that both of these switches have to be closed before the "up" movement can commence, will be simplified later when describing the operation of the device.

The paper tray circuit PT (FIG. 15)

The paper tray circuit PT moves the paper tray 55 and has a pair of movements, an "up" movement and a "down" movement, with a reversing arrangement. In this case, however, the operation is shown to be by solenoid and a hydraulic circuit rather than by motor. A motor could be used instead, or a pneumatic circuit could be used; what is shown is an example. There is a normally open "start-up" switch PTS1 for automatic operation, in series with a normally closed stop switch PTS2 and a relay PTRA. The switch PTS1 is on the frame 20 and is actuated by the cam 48 as the stripper plate 24 moves to its completely "out" position. The switch PTS2 is actuated by the hydraulic pressure that builds up when the cylinders CPT have raised the tray 55 to the upper limit desired, and the switch PTS2 then stops upward movement and simultaneously initiates downward movement by energizing a relay PTRB. The relay PTRA has two normally open contacts PTRA1 and PTRA3 across lines L1 and L3, respectively, to control the up side of a solenoid PTCA operating the valve PTV shown in FIG. 17. A holding switch PTRA4 is provided across the "start-up" switch PTS1. The relay PTRB has three normally open switches, of which PTRB1 and PTRB3 are across lines L1 and L3. The switches PTRB1 and PTRB3 control the down solenoid PTCB, shown as used in FIG. 17. The switch PTRB4 is a holding switch.

The "down" control circuit thus has a difference from the other circuits discussed in that there is no separate start switch. The paper tray 55 is moved up to its top position where a sheet of paper P is taken off by the suction cups 44, and then the switch PTS2 that stops its "up" movement simultaneously starts the "down" movement by closing against a contact that energizes the relay PTRB long enough for the holding switch PTRB4 to take over.

A normally closed down stop switch PTS3 is in series with the relay PTRB. The switch PTS3 is actuated by bottoming of the paper tray 55. A manual start switch PTS4 enables cycling the paper tray 55 in starting operations, as explained in the section below entitled, "Operation—Starting." Interlocks, provided by switches PTS5, PTS6, PTS7 and PTS8, mean that only the "up" relay PTRA or the "down" relay PTRB can be operated, not both at once, and the relay PTRB is in series with the interlock PTS7.

The pallet conveyor circuit PC (FIG. 16)

The pallet conveyor circuit PC controls the pallet conveyor chains 75 and 81 for forward and a reverse movement. In this instance there is an "and" start system comprising two switches PCS1 and PCS2 in series, both normally open and both having to be closed before a relay PCRA can be energized. The switch PCS1 is actuated by a fully loaded pallet 51 depressing the assembly 77 as it descends (FIGS. 8 and 9), while the switch PCS2 is actuated only when the hoist 50 is fully bottomed. A normally closed stop switch PCS3 on the deck 82 and actuated by a loaded pallet reaching the end of the deck 82 is in series with the relay PCRA, and the start switches PCS1 and PCS2 and a holding set of contacts PCRA4 is controlled by the relay PCRA. The relay PCRA also controls three normally open contacts PCRA1, PCRA2, PCRA3, respectively in lines L1, L2, and L3 to a motor PCM. There is a jog "forward" switch PCS4, which operates like that in the stripper plate circuit SP to enable short movement by manual control. Similarly, for reverse movement, there is a jog "reverse" switch PCS5, which connects with a relay PCRB. The "reverse" relay PCRB acts to reverse the movement of the motor PCM when the relay PCRB is energized to close switches PCRB1, PCRB2, PCRB3, and its holding switch PCRB4 is in parallel across the relay PCRB.

An interlock system like those already described has switches PCS6, PCS7, PCS8 and PCS9 and assures that that reverse and forward cannot be operated at the same time. Reverse is used only in jogging, to enable maintenance and alignment. Forward is used in the automatic operation and also in jogging, if desired.

The pallet feed circuit PF (FIG. 16)

The final circuit of the block diagram FIG. 11 is that for the pallet feed, for opening and closing the dogs 72 to release one pallet and to check the next one up on the stack. Here, there is an automatic "start-open" switch PFS1 which is normally open and is in series with a normally closed stop switch PFS2 and with the relay PFRA for the "open" movement of the pallet feed device 70. The switch PFS1 is momentarily closed by the cam 59a when it reaches its topmost position, after the empty pallet has been placed on the hoist 50 and raised into position to receive the first layer of cans. The switch PFS2, as shown in FIG. 10, is actuated by a crank 74 when the dogs 72 have been fully retracted. The relay PFRA, when energized, closes its normally open switches PFRA1 and PFRA3 across lines L1 and L3 to operate a solenoid PFCA that controls a valve PFV shown in FIG. 17. Its normally open switch PFRA4 operates to hold the "open" circuit on, once the "start-open" switch PFS1 has been energized. In parallel with the automatic switch is a manual "start-open" switch PFS3, the significance of which will be explained later.

The "close" circuit includes another set of contacts closed by the movement of the switch PFS2, so that the dogs 72 are fully retracted and are then closed. There is also a normally closed stop switch PFS4 in series with a relay PFRB. The switch PFS4, as shown in FIG. 10, is opened by an arm 85 on the crank 74 when the dogs 72 are back in their pallet retaining position. There are interlock switches PFS5, PFS6, PFS7 and PFS8 assuring that there will not be energization of both the "open" and "close" relays PFRA and PFRB at the same time. In addition to closing a holding switch PFRB4, the relay PFRB closes normally open switches PFRB1 and PFRB3 across lines L1 and L3, respectively, which operate the "close" solenoid PFCB for the valve PFV.

The hydraulic circuit (FIG. 17)

An hydraulic circuit suitable for use with this invention may have four main circuits, a stripper plate circuit with cylinders CSP for moving the stripper plate 24 "out" and "in." a paper tray circuit with cylinders CPT for raising and lowering the paper tray 55, a pallet feed circuit with cylinders CPF for opening and closing the dogs 72 which release the bottom pallet 51 of the stack of empty pallets to the pallet conveyor chains 75 and which then holds the next-to-bottom pallet up, and a clamp circuit with a cylinder CCC for energizing and releasing the can clamps 30. The hydraulic circuit includes the electric motor HPM, which is run continuously by the hydraulic pump electric circuit previously described (FIG. B) to drive two pumps HPA and HPB.

The stripper plate 24 is moved by the two cylinders CSP, which are supplied through the pump HPB and are actuated through the valve SPV with (by the solenoids SPCA and SPCB) from which the fluid flows through a cam-operated flow-control valve SPFV in series therewith. This cam is attached to the stripper plate in such a way as to insure smooth starts and stops of the stripper plate 24. As the stripper plate 25 moves away from its closed position, the flow of fluid increases with the movement of the plate 24, thus accelerating its movement. As the stripper plate 24 nears the outward end of its stroke, this cam gradually closes the flow-control valve SPFV, decelerating the plate movement so that the stripper plate 24 comes to a gentle stop. The same action controls the return movement of the stripper plate 24.

The pump HPA supplies the series valves PTV, PFV, and CCV, each of which is solenoid controlled, as explained in the description of the electric circuits. The paper tray circuit has a hydraulic actuation for the switch PTS2 which stops the upward movement and initiates the down movement. The clamp circuit includes an accumulator CCA between the valve CCV and the cylinder CCC.

It will be apparent that the hydraulic system may be replaced by a pneumatic system with very slight changes in the operation, or may be replaced by a series of motors such as those described in some of the electrical circuits.

Operation—Starting

The palletizer of this invention is fully automatic and does not require an operator, except in starting up. Then there are certain things that the operator must do. Once operation is started, it goes on automatically, for it is sequential, with each operation initiating the next operation in the sequence. Yet there is no timing device, and there are no stepping switches.

To prepare the machine for operation, some cans C are first placed on the short draper 23, with a row of tangent cans at the front row under the can clamps 30 and several rows of cans arranged in a desired pattern sufficiently far back to cover the short draper 23 completely and to extend on to the long draper 22. The diamond pattern is probably the most desirable one to use for it is self-aligning, but other self-aligning patterns can be used if desired.

The paper tray 55 is loaded with paper P, and pallets 51 are placed in the empty pallet bin 71. The first empty pallet is placed by hand and is securely held by the pallet feed dogs 72, which engage the pallet 51 between its upper and lower deck boards 52 and 53. Additional pallets 51 are then placed on top of the original pallet, either by hand or by a lift truck, as desired.

The electrical and hydraulic systems are activated by first turning the main control panel disconnect switch S to its "on" position (FIG. 11). Then the start button MCS3 can be depressed. All other disconnect switches (mostly not shown) are then placed in "on" position, and the start buttons HPS2 for the hydraulic pump, VPS2 for the vacuum pump, and LDS2 for the long draper 24 are pressed, in that order (FIG. 12). This turns on the hydraulic pump motor HPM, the vacuum pump motor VPM, and the long draper motor LPM, all of which remain on and run continuously during operation of the palletizer.

The pallet feed 70 is then cycled by depressing the pallet feed manual start button PFS3 (FIG. 16), to place the bottom pallet 51 on the conveyor chains 75, ready for insertion into the hoist 50. The hoist platform 60 is run to its down position by holding the hoist "down" jog button HS7 (FIG. 15) until the hoist platform 60 is bottomed, then a cam 58 opens the switch HS2, and the hoist 50 automatically stops at its lowest position.

The stripper plate 24 is run "out" by holding the stripper plate "out" jog button SPS6 (FIG. 14) down until the stripper plate 24 stops in its outermost position. If the stripper plate 24 happens already to be at rest in its "out" position, it is necessary to attach a sheet of paper P to the device by depressing the paper tray manual start button PTS4 (FIG. 15). Otherwise it is not necessary to use this button.

The empty pallet 51 placed on the conveyor chains 75 at the time that the pallet feed 70 is cycled is now run onto the hoist 50 by depressing the pallet conveyor "forward" jog button PCS4 (FIG. 16) and holding it down until the first pallet 51 strikes the pallet stop 78 (FIGS. 8 and 9), which then initiate the hoist "up" sequence by closing the switch HS3, the switch HS8 having been closed by bottoming of the hoist 50 (FIG. 15). The motor HM then raises the hoist 50 with the pallet 51 on it to its proper position, brings the stripper plate 24 into its operating position, and places one sheet of paper P on the empty pallet 51.

The palletizer is now ready for normal operation. The unit is ready to receive cans, and further operation is entirely automatic.

Normal operation

The cans C are fed in an upright position by the single-filer 27 to the long draper 22 at approximately the midpoint between its two sides 25 and 26. The long draper 22 moves forward continuously and automatically arranges the cans C in the diamond pattern that has been set up on the short draper 23, and the cans accumulate, backing up upon the long draper 22. The normally open limit switch CCS1 (FIGS. 1 and 13) is mounted in the side wall 25 of the pattern-forming area of the long draper 22, so that when the pattern backs up sufficiently far so that it contains one full pallet layer of cans, the sidewise pressure of the outer can in the last row closes the switch CCS1. When the microswitch CCS1 is closed, current is fed to the can clamp solenoid CCCA (FIG. 13) and opens the "up" side of the hydraulic valve CCV (FIG. 17). Through its mechanical linkage, the can clamp 30 is then raised, freeing the front row of cans. When the can clamp 30 reaches its upper limit of motion, the lever 35 that moves with it contacts the normally open switch SDS2 (FIG. 13), and closes it, starting the short draper motor SDM. The short draper 23 then moves the entire pattern of cans C forward onto the stripper plate 24. As the cans C move forward, the pressure holding the switch CCS1 closed is removed, and the hydraulic valve CCV returns to its neutral position, leaving the can clamp 30 in its upper position. The short draper 23 continues to move the cans forward.

When the layer of cans moving onto the stripper plate 24 reaches the far end wall 42 of the stripper plate 24, the locater 43 assures that the cans C are correctly positioned for discharge onto the sheet of paper P on the waiting pallet 51, and their arrival there exerts pressure on the normally open limit switch SPS1 (FIGS. 1 and 14), closing it and energizing the relay SPRA. Energization of the relay SPRA closes the switches SPRA1 and SPRA3 controlling the "out" side of the magnetic reversing starter and energizes the solenoids SPCA and CCCB and the relay SDMR. The solenoid SPCA opens the hydraulic valve SPV (FIG. 17) to feed hydraulic fluid to the two cylinders CSP that then move the stripper plate 24 out from beneath the layer of cans C. The relay SDMR opens the switch SDS1 (FIG. 13) and stops the short draper motor SDM. The energization of the can clamp solenoid CCCB actuates the hydraulic valve CCV, so that the cylinders CCC move the can clamp 30 to its down position, and they firmly clamp the front row of cans C then resting beneath them. Cans then build up behind that row and the pattern therebehind in the way described earlier, so that the pattern is being prepared for the next layer while the operations now to be described are taking place.

As the stripper plate 24 moves away from its "in" position, the cam 45 attached to it (FIG. 12) closes a normally open valve 46 in the vacuum line 47 to place a vacuum suction on the paper pickup suction cups 44, so that there is suction at the cups 44.

When the stripper plate 24 arrives at its outermost position, all the cans of that layer have been deposited on the pallet 51, and the following events have taken place: (a) A cam 48 on the stripper plate carriage engages and opens the normally closed limit switch SPS2 (FIGS. 1 and 14), deenergizing the relay SPRA and opening the switches SPRA1 and SPRA3 of the magnetic reversing starter and returning the hydraulic valves SPV and CCV to neutral. This stops the outward movement of the stripper plate 24 and also leaves the can clamp 30 in its down or clamping position, the accumulator CCA shown in FIG. 17 holding the clamp 30 down. (b) The cam 48 of the stripper plate 24 engages the normally open limit switch PTS1 (FIGS. 1 and 15), energizing the "up" relay PTRA and sending current to the "up" solenoid PTCA for the hydraulic valve PTV. Hydraulic fluid (FIG. 17) flows to the twin cylinders CPT which raise the paper tray 55. The paper tray 55 continues rising until the top sheet of paper P comes into contact with the row of suction cups 44 positioned along the bottom of the inner edge of the stripper plate 24 (FIG. 6), which then arrests further forward motion, and the pressure then builds up in the hydraulic lines until sufficient pressure is achieved to throw the double-throw pressure switch PTS2 (FIGS. 17 and 15). Movement of the pressure switch PTS2 opens the "up" side of the paper-tray circuit PT (FIG. 15), deenergizing the relay PTRA and hence deenergizing the solenoid PTCA so that the hydraulic valve PTV is returned to neutral. Simultaneously, the "down" side of the circuit PT is closed, energizing the relay PTRB to feed current to the "down" solenoid PTCB, which moves the hydraulic valve PTV to its "down" position. Hydraulic fluid then flows to the opposite side of the paper tray cylinders CPT, moving the tray 55 to move down away from the stripper plate 24. When the paper tray 55 reaches its down position, it engages and opens the normally closed limit switch PTS3, opening the circuit to the "down" relay PTRB, deenergizing the solenoid PTCB and returning the hydraulic valve PTV to its neutral position. As a result of the just-described operation, the top piece of paper P is picked up by the vacuum cups 44 from the stack in the paper tray 55 and is held in position ready for insertion over the layer of cans just deposited on the pallet 51 so that it will lie between that layer and the next layer then being formed, this deposit taking place while the stripper plate 24 returns to its "in" position. (c) The cam 48 on the stripper plate 24 closes the normally open limit switch HS1 (FIGS. 1 and 15) which energizes the "down" hoist relay HRB, resulting in energization of the hoist motor HM, causing the hoist 50 to move down.

After the hoist 50 has descended the height of one can, one of the cams 58 fixed to the hoist cam rod 68 (see FIG. 5) opens the normally closed limit switch HS2, deenergizing the relay HRB, and the hoist 50 stops. Also, the same cam 58 closes the normally open limit switch SPS3 (FIGS. 5 and 14) and energizes the "in" relay SPRB, closing the switches SPRB1 and SPRB3 so that the "in" solenoid SPCB is energized and actuates the hydraulic valve SPV (FIG. 17) for the stripper plate 24. Hydraulic fluid then flows to the twin cylinders CSP so that they return the stripper plate 24 to its "in" position ready to receive the next layer of cans.

As the stripper plate 24 returns to its "in" position, it carries with it the sheet of paper P picked up from the paper tray 55, as described above, and as it reaches the "in" position, the cam 45 affixed to the stripper plate opens the valve 46 in the vacuum line 47 (FIG. 12) bleeding the vacuum which has held the paper P to the stripper plate 24. As a result, the paper P is laid on top of the stacked cans C in the correct position, ready to receive the next layer of cans.

When the stripper plate 24 approaches or reaches its "in" position, the cam 48 (or a separate cam) opens the normally closed limit switch SPS4 (FIGS. 1 and 14), interrupting the flow of current through the relay SPRB and thereby deenergizing the solenoid SPCB, so that the hydraulic valve SPV (FIG. 17) returns to its neutral position, stopping the flow of hydraulic fluid to the two cylinders CSP. Thus, the stripper plate motion is stopped.

The above described normal operation is automatically repeated cyclically until all except the last of the desired number of layers has been deposited on the pallet.

Last layer operation

The last layer initiates a slightly different sequence ejecting the loaded pallet 51 and placing an empty pallet ready to begin the next stack. After the uppermost layer is stripped, the hoist 50 is started down in the usual manner, but the cam 59, which functions otherwise in the same manner as the cam 58 described above, is shaped as not to actuate the switch SPS3; thus the stripper plate 24 is retained in its "out" position. The hoist platform 60 continues to move down and is stopped when the cam 59 actuates the switch HS2 so as to deposit the loaded pallet 51 on the pallet conveyor chains 81. When the hoist 50 reaches its lowest point, it actuates two normally open limit switches PCS1 and PCS2 (FIGS. 8, 9 and 16), which are connected in series for "and" operation. This "and" circuit is a safety device, insuring that actuation is accomplished by a loaded pallet 51 rather than by a falling can or some other accidental object. The simultaneous closing of the two limit switches PCS1 and PCS2 energizes the relay PCRA and starts the pallet conveyor chain motor PCM, moving the loaded pallet out of the machine.

Simultaneously, an empty pallet 51 which already rests on the conveyor chain 75 is pulled from the bottom of the pallet bin 71. As the empty pallet 51 arrives in the correct position, it engages the stop 78 (FIGS. 8 and 9), which acts to close the normally open limit switch HS3 (FIGS. 8, 9 and 15). The closing of the limit switch HS3 energizes the "up" relay HRA and this starts the hoist motor HM to move the hoist up, so long as the switch HS8 is closed at this time by bottoming of the hoist 50. As the hoist 50 with the empty pallet in place nears its upper position, the cam 59a affixed to the bottom of the rod 68 closes the normally open limit switch SPS5 (FIG. 14) (which is connected in parallel with the switch SPS3) and energizes the "in" relay SPRB, which energizes the "in" solenoid SPCB and activates the hydraulic valve SPV; hydraulic fluid is thus caused to flow to the twin cylinders CSP, which then return the stripper plate 24 to its "in" position ready to receive the first layer of cans for the new stack. The sheet of paper P carried into position by the stripper plate 24 is released in position as previously described.

While the hoist 50 is carrying the empty pallet up into place, the pallet conveyor chains 81 continue to move the loaded pallet 51 out of the machine until it is clear of the machine. Then, when the loaded pallet 51 is clear, it opens the normally closed limit switch PCS3 (FIGS. 1 and 16), which interrupts the current to the relay PCRA and causes the pallet conveyor chains 81 and 75 to stop.

As the hoist 50 with the empty pallet nears the uppermost point of its travel, the bottommost cam 59a affixed to it closes the normally open limit switch PFS1 (FIG. 16), which energizes the "up" relay PFRA that, in turn, energizes the "up" solenoid PFCA and actuates the hydraulic valve PFV, so that hydraulic fluid flows to the "up" side of the twin pallet feed cylinders CPF. As the pallet feed hoist 70 lifts the lower pallet, the four suitably arranged dogs 72, which have been holding the pallet, are removed to a withdrawn position by the over-the-center spring arrangement, described earlier.

When the pallet feed 70 reaches its uppermost position, a lever 85 (FIG. 10) engages the microswitch PFS2, opening the circuit of the "up" relay PFRA, stopping the upward motion of the pallet hoist 70 and simultaneously closing the circuit to the "down" relay PFRB, energizing the solenoid PFCB (FIG. 16). As a result, hydraulic fluid flows to the opposite side of the pallet feed cylinders CPF (FIG. 17), and the cranks 74 are moved down. As they move down, the spring-loaded dogs 72 spring back into position, catching the next to the bottom pallet, while the bottom pallet has dropped to the chains 75, where it is free to move out onto the hoist 50 when the next complete cycle requires placement of another new pallet. The motion of the cranks 74 is arrested when the previously mentioned lever opens the normally closed limit switch PFS4, interrupting the circuit to the relay PFRB, which in turn deenergizes the "down" solenoid PFCB and deactuates the hydraulic valve PFV, returning that valve to neutral and bringing the pallet feed mechanism to rest.

As the hoist 50 approaches its uppermost position, it is stopped in the proper position when the cam 59a affixed to the hoist rod 68 engages the normally closed limit switch HS4 (FIG. 15). This interrupts the circuit to the "up" relay HRA and stops the hoist motor HM.

Special safety devices

In the description of the circuit, several switches were mentioned that are used for safety or for other special purposes.

The stop switch MCS2 (FIG. 11) is located on a control panel on the opposite side of the machine from the main panel, so that in an emergency all the functions of the machine may be stopped from either side of the palletizer by pressing the button for either switch MCS1 or MCS2. The start button MCS3 must be pressed again before any part of the equipment can be started again.

The limit switch CCS2 (FIG. 13) is located in such a location that the stripper plate 24, when in the "in" or closed position, holds it closed; otherwise it moves to a normally open position. The switch CCS2 is connected in series with the start-up switch CCS1 of the can clamps 30. Thus the transfer of the accumulated tier of cans cannot be initiated unless the stripper plate 24 is in the correct position to receive them.

In the normal operation of the machine, as described above, the movements of the stripper plate 24 are entirely automatic. However, at start-up and during cleaning of the machine or for maintenance purposes it is important that the plate 24 be withdrawn out of sequence and moved or stopped at various positions, and that is the main reason for the two jog switches SPS6 and SPS7 (FIG 14). The stripper plate 24 can be moved by them in either direction and can be stopped at any desired position of its travel.

The double pull-push button switch HS5 (FIG. 15), which is located in the control panel, is wired into the hoist control circuits in such a way that by manually depressing it the holding circuit of whichever side of the hoist circuit is then in use is interrupted, and the ascent or descent of the hoist 50 is arrested right at that point. In addition, the hoist 50 has been provided with jog switches for both directions, namely, the jog "up" switch HS6 and the jog "down" switch HS7. These switches enable movement of the hoist 50 independently of the automatic sequential operation and also enable it to be moved as desired for cleaning or maintenance.

The normally open limit switch HS8 is mounted on the frame so that it is closed by the presence of the hoist at its lower extremity. As shown in the circuit diagrams, the switch HS8 is wired into the start-"up" control circuit of the hoist 50 in such a manner that the hoist 50 cannot be started upward from any position except the lower extremity of its travel, except by the jog "up" circuit. This is an important safety feature; before the hoist 50 can run in its automatic sequence in upward direction, it must first bottom.

Jog switches have also been provided for the pallet conveyor chains 81, as PCS4 and PCS5 (FIG. 16) to enable movement of the pallet conveyor in either direction independently of the automatic automated sequential operation, for the same general reasons.

The limit switch SPS8 (FIG. 14) is normally open and is connected in series with the "in" circuit of the solenoid SPCB. It is mounted where it is held closed by the presence of the paper tray 55, when the paper tray 55 is in its "down" or normal position. This enables the switch SPS8 to serve as the paper tray position monitor, to make sure that the stripper plate 24 does not start "in" before the paper tray 55 and its load of paper P have dropped clear of the suction cups 44 on the bottom inner edge of the stripper plate 24.

The normally closed photocell-actuated switch SPS9 is connected in series with the "in" control circuit for the relay SPRB. This photocell SPPC is controlled by a beam of light projected across the hoist well slightly above the uppermost tier and the innermost row of each successive tier as it stands in its place in the growing stack. If the cans have been properly placed by the action of the stripper plate 24, the beam is uninterrupted and the operation continues in its normal sequence. If however, one or more cans have not dropped into their proper place in this particular row or tier, the beam is interrupted and the stripper plate 24 cannot be started inward until the obstruction is removed. This is needed only at this point because the cans otherwise do not interfere.

The vacuum pressure switch SPS10 is also connected in series with the "in" control circuit of the relay SPRB. The pressure side of the switch SPS10 is placed in the paper pickup vacuum line 47, so that the vacuum created in the line by the presence of the sheet of paper on the vacuum cups closes the electric circuit and enables the stripper plate 24 return to be started in the normal manner. However, if the necessary vacuum is not created in the pneumatic line, the stripper plate 24 return cannot be started, indicating that for some reason the vacuum cups 44 have not picked up a sheet of paper P. This may be because there was no paper in the tray 55 or may be because the paper was torn or deformed or because there was a leak in the vacuum line 47, but for whatever reason, attention is called to the fact that there is trouble that should be remedied.

From the foregoing, it will be apparent that the machine may be adapted to take different sizes of cans and pallets, and the machine may be made adjustable by making adjustable the can guides, the pattern forming guides, and clamp location, by changing the location of some microswitches, by altering the paper feed tray, the pallet feed bin, and the pallet conveyor chains, and by replacing or altering the hoist cam-supporting rod and the cams thereon. There is no difficulty in doing any of these things, although it may take some time to do all of them, if all are required. In any event, different sizes of cans and pallets can be accommodated by such procedure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A can palletizer, including in combination:
   a continuously moving long draper,
   means for presenting cans to said long draper,
   a normally stopped short draper having a rear end to which cans are delivered by said long draper, and having a forward end,
   can clamp means normally holding a front row of cans at the forward end of said short draper,
   a stripper plate adjacent the forward end of said short draper and to which cans are delivered at transfer time by said short draper,
   a stripping end wall for stripping cans from said stripper plate when it is moved,
   hoist means for supporting a pallet beneath the normal position of said stripper plate and for raising a said pallet to a level slightly below said stripper plate,
   means at said long draper for releasing said can clamp means when a desired number of cans have been backed up on said long draper after having filled said short draper,
   means actuated upon release of said can clamp means for causing said short draper to move cans thereon onto said stripper plate,
   means actuated by said cans reaching the far end of said stripper plate for reenergizing said can clamp means, stopping said short draper, and causing said stripper plate to move out beneath said stripping end wall to drop said cans onto said pallet or onto a layer of cans already on said pallet, to make a palletized can layer, and
   means actuated upon transfer of the cans from said stripper plate to said pallet for causing said hoist means to be lowered by the height of one layer of cans and then to stop and for causing said stripper plate to return to its original position adjacent said short draper.

2. The palletizer of claim 1 having:
   means for storing a stack of paper sheets the size of the area of the pallet,
   means on said stripper plate for picking up one sheet from said stack each time it reaches its fully stripped position and for carrying it with it on its return, and
   means for releasing said paper sheet when said stripper plate has returned to its original position.

3. The palletizer of claim 1 having means after a preselected number of layers has been deposited on said pallet for lowering said hoist means and for transferring said pallet away from said hoist means to a dock where it can be picked up and moved elsewhere.

4. The palletizer of claim 3 having means for retaining a stack of empty pallets adjacent said hoist means and means for transferring one empty pallet to said hoist means when the filled pallet has been transferred therefrom, said empty pallet then being raised to its uppermost position.

5. The palletizer of claim 4 having means for holding said stripper plate "out" in its stripped position while the filled pallet is moved away from said hoist means, the empty pallet placed on said hoist, and while said empty pallet is raised to its uppermost position, and means for then returning said stripper plate to its original position.

6. A can palletizer, including in combination:
   a normally stationary draper of substantially pallet width having a rear end and a forward end,
   can clamp means for normally holding in place a front row of cans at the forward end of said draper,
   means for building up a pattern of cans behind said front row,
   stripper plate means adjacent the forward end of said draper and to which cans are delivered at transfer time by said draper,
   a stripping wall above said stripper plate at one edge thereof,
   hoist means for supporting a pallet beneath the normal position of said stripper plate and for raising a said pallet to a level slightly below said stripper plate,
   means for releasing said can clamp means when a desired number of cans have been backed up behind said front row,
   means for causing said draper to move cans onto said stripper plate upon release of said can clamp means,
   means actuated upon the transfer of a desired number of said cans to said stripper plate for reenergizing said can clamp means, stopping said draper, and causing said stripper plate to move out beneath said stripping wall to drop said cans onto said pallet or onto a layer of cans already on said pallet, to make a palletized can layer, and
   means actuated upon transfer of the cans from said stripper plate to said pallet for causing said hoist means to lower by the height of one layer of cans and then to stop and for causing said stripper plate to return to its original position adjacent said draper.

7. The palletizer of claim 6 having:
   means for storing a stack of paper sheets the size of the area of the pallet,
   means on said stripper plate for picking up one sheet from said stack each time it reaches its fully stripped position and for carrying it with it on its return, and
   means for releasing said paper sheet when said stripper plate has returned to its original position.

8. The palletizer of claim 7 having means after a preselected number of layers of cans and paper has been deposited on said pallet for lowering said hoist means and for transferring said pallet away from said hoist means to a dock where the loaded pallet can be picked up and moved elsewhere.

9. The palletizer of claim 8 having means for retaining a stack of empty pallets adjacent said hoist means and means for transferring one empty pallet to said hoist means when the filled pallet has been transferred therefrom, and means for then raising said empty pallet by said hoist means to its uppermost position.

10. The palletizer of claim 9 having means for retaining said stripper plate in its stripped position while the filled pallet is moved away from said hoist means, an empty pallet placed on said hoist, and said empty pallet raised to its uppermost position, and means for then returning said stripper plate to its original position and for depositing on said empty pallet a sheet of said paper.

11. A can palletizer, including in combination:
a continuously moving long draper,
means for presenting cans to said long draper,
a normally stationary short draper having a rear end to which cans are delivered by said long draper, and having a forward end,
can clamp means normally holding a front row of cans at the forward end of said short draper,
a stripper plate adjacent and forward of the forward end of said short draper and to which cans are delivered at transfer time by said short draper,
a stripping end wall at the forward end of said stripper plate,
a hoist for supporting a pallet beneath the normal position of said stripper plate and for raising a said pallet to a level slightly below said stripper plate,
switch means at said long draper for causing release of said can clamp means when a desired number of cans have been backed up on said long draper after having filled said short draper,
switch means actuated by release of said can clamp means for causing said short draper to move and to transfer cans onto said stripper plate,
switch means actuated by said cans reaching said stripping end wall for reenergizing said can clamp means, stopping said short draper, and causing said stripper plate to move out beneath said stripping end wall and deposit said cans onto said pallet or onto cans already on said pallet, as a palletized can layer, and
switch means actuated upon transfer of the cans from said stripper plate to said pallet for causing said hoist to be lowered by the height of one layer of cans and then to stop and for causing said stripper plate to return to its original position adjacent said short draper.

12. The palletizer of claim 11 having:
means for storing a stack of paper sheets the size of the area of the pallet beneath the fully stripped position of said stripper plate,
vacuum cup means on said stripper plate for picking up one sheet from said stack each time it reaches its fully stripped position and for carrying it with it on its return, and vacuum means for releasing said paper sheet when said stripper plate has returned to its original position.

13. The palletizer of claim 12 having switch means actuated after a preselected number of layers has been deposited on said pallet for causing the lowering of said hoist and actuating transfer means for carrying the loaded pallet away from said hoist to a dock where it can be picked up and moved elsewhere, and switch means on said dock for deactuating said transfer means when said loaded pallet attains said dock.

14. The palletizer of claim 13 having means for retaining a stack of empty pallets adjacent said hoist and means for transferring one empty pallet to said hoist when the filled pallet has been transferred therefrom, said empty pallet then being raised to its uppermost position.

15. The palletizer of claim 14 having safety means for preventing movement of said hoist upward unless said hoist has been fully bottomed and has received an empty pallet.

16. The palletizer of claim 14 having means for retaining said stripper plate in its stripped position while the filled pallet is moved away from said hoist, while the empty pallet is placed on said hoist, and while said empty pallet is raised to its uppermost position and means for then returning said stripper plate to its original position and depositing on said empty pallet a sheet of said paper.

17. The palletizer of claim 12 having means for preventing the return of said stripper plate to its original position unless it is carrying a sheet of paper.

18. The palletizer of claim 12 having means for preventing the return of said stripper plate to its original position until said means for storing is lowered out of the way, said means for storing being raised to present paper to said stripper plate.

References Cited

UNITED STATES PATENTS

| | | |
|---|---|---|
| 2,739,718 | 3/1956 | Birchall. |
| 2,928,559 | 3/1960 | Mosely. |
| 2,949,179 | 8/1960 | Busse. |
| 3,050,199 | 8/1962 | McGrath et al. |
| 3,245,557 | 4/1966 | Maramonte et al. |
| 3,402,830 | 9/1968 | Copping et al. |
| 3,442,401 | 5/1969 | Wolfe et al. |

GERALD M. FORLENZA, Primary Examiner

R. J. SPAR, Assistant Examiner

PO-1050
(5/69)

UNITED STATES PATENT OFFICE
CERTIFICATE OF CORRECTION

Patent No. 3,522,890      Dated August 4, 1970

Inventor(s) Thomas D. Birchall

It is certified that error appears in the above-identified patent and that said Letters Patent are hereby corrected as shown below:

Column 1, line 58, "additional" should read -- addition --. Column 4, line 54, "re" should read -- are --. Column 7, line 38, "closely" should read -- closed --. Column 7, line 71, "cricuits" should read -- circuits --. Column 9, line 54, insert -- stripper plate circuit, to give brief manually controlled -- before "operation". Column 11, line 56, "25" should read -- 24 --.

Signed and sealed this 15th day of June 1971.

(SEAL)
Attest:

EDWARD M. FLETCHER, JR.      WILLIAM E. SCHUYLER, JR.
Attesting Officer      Commissioner of Patents